(12) United States Patent
Porscha

(10) Patent No.: US 7,670,572 B2
(45) Date of Patent: Mar. 2, 2010

(54) MULTI-PHASE FLUID DISTRIBUTOR FOR A BUNDLED-TUBE REACTOR

(75) Inventor: Peter Porscha, Kelkheim (DE)

(73) Assignee: Uhde GmbH, Dortmund (DE)

( * ) Notice: Subject to any disclaimer, the term of this patent is extended or adjusted under 35 U.S.C. 154(b) by 422 days.

(21) Appl. No.: 10/571,247

(22) PCT Filed: Sep. 10, 2004

(86) PCT No.: PCT/EP2004/010156

§ 371 (c)(1),
(2), (4) Date: Jan. 10, 2007

(87) PCT Pub. No.: WO2005/025716

PCT Pub. Date: Mar. 24, 2005

(65) Prior Publication Data
US 2007/0272298 A1 Nov. 29, 2007

(30) Foreign Application Priority Data
Sep. 10, 2003 (DE) ............... 103 41 896

(51) Int. Cl.
B01J 10/00 (2006.01)
(52) U.S. Cl. .................. 422/197; 422/196
(58) Field of Classification Search .......... 422/197, 422/196; 137/1, 263; 516/8.1; 366/340
See application file for complete search history.

(56) References Cited

U.S. PATENT DOCUMENTS

| | | | | |
|---|---|---|---|---|
| 470,060 | A * | 3/1892 | Lillie ............... | 159/13.2 |
| 3,849,232 | A * | 11/1974 | Kessler et al. ...... | 159/13.2 |
| 4,067,902 | A * | 1/1978 | Werges .............. | 564/127 |
| 4,102,778 | A | 7/1978 | Ruether | |
| 4,133,485 | A * | 1/1979 | Bouvin ............. | 239/399 |
| 4,267,978 | A | 5/1981 | Manteufel | |
| 5,004,043 | A * | 4/1991 | Mucic et al. ....... | 165/118 |
| 5,054,547 | A * | 10/1991 | Shipley ............. | 165/115 |
| 5,217,065 | A * | 6/1993 | Green et al. ....... | 165/117 |
| 5,882,610 | A | 3/1999 | Darmancier et al. | |
| 6,066,232 | A * | 5/2000 | Mohr et al. ........ | 159/13.3 |
| 6,613,219 | B2 | 9/2003 | Harter et al. | |

(Continued)

FOREIGN PATENT DOCUMENTS

DE 22 12 816 10/1973

(Continued)

*Primary Examiner*—Walter D Griffin
*Assistant Examiner*—Natasha Young
(74) *Attorney, Agent, or Firm*—Marshall & Melhorn, LLC (57) ABSTRACT

A distributor includes first and second liquid distribution systems for two liquid phases for an upright tube-bundle reactor. The first system is arranged directly above or on a tubesheet and is connected to at least one outer feed device and contains an annular weir. The second system is connected to at least one other outer feed device and contains one upper and one lower distribution tray which contains a plurality of openings which are arranged flush above the inlet sleeves of the first system, and has at least one device for setting a uniform liquid level above the openings. The upper distribution tray is connected to the feed device for liquid, and contains a plurality of overflow weirs from which the liquid is able to discharge into the lower distribution tray. Each of the overflow weirs is assigned to a plurality of openings of the lower distribution tray.

16 Claims, 5 Drawing Sheets

U.S. PATENT DOCUMENTS

2004/0141892 A1 * 7/2004 Van Hasselt et al. ........ 422/195
2005/0035473 A1 * 2/2005 Manteufel .................... 261/97

FOREIGN PATENT DOCUMENTS

| DE | 29 19 462 A | 7/1980 |
| WO | WO 02/070120 A1 * | 9/2002 |
| WO | WO 03/053563 A1 * | 7/2003 |

* cited by examiner

MULTI-PHASE FLUID DISTRIBUTOR FOR A BUNDLED-TUBE REACTOR

BACKGROUND OF THE INVENTION

The invention relates to a liquid distributor for two liquid phases to be uniformly distributed into a plurality of tubes of an upright tube-bundle reactor. Such tube-bundle reactors are used to carry out chemical reactions which are either highly exothermic or endothermic, and in which a certain temperature range must be adhered to. Whilst the chemical reaction takes place inside the tubes, which are filled with bulk material, for example, the tubes on the outside are tempered, i.e. either cooled or heated. The tubes are normally retained at the top and bottom by tubesheets and are therefore closed or sealed against the outside of the tube. Furthermore, normal tube-bundle reactors exhibit an outer jacket and openings for feed and discharge pipes, as well as for assembly purposes. The outer jacket normally also delimits the distribution chamber above the tubesheet on the outside.

In such reactors the uniform dosing of the reactants presents difficulties, particularly in the case of two liquids which cannot be mixed and which, because of their non-miscibility, cannot be pre-mixed and must therefore be introduced separately into the individual tubes of the tube bundle, for example, an aqueous and an oily phase. Difficulties also arise if one of the two liquids or both of them are supplied in small throughputs and the discharge points are therefore subject to interfacial effects of the liquids, e.g. radial deflection, and when, in addition, the required small discharge openings may be blocked by particles of dirt.

A further difficulty arises in cases where not only the two liquids but also a gas flow is to be fed into the individual tubes of the tube bundle, whether as a further reaction medium, as a stripping medium for reaction products or for flushing undesirable secondary products. Such a difficulty regularly occurs when the tube-bundle reactors contain bulk material, e.g. catalyst inventory or carrier material for biological processes, and provision is made for the reactor to operate as a trickle-bed reactor.

Difficulties of the above-mentioned type may also be mutually intensifying when the gas flow and liquid drops or fine liquid jets influence each other, for example, liquid is dispersed.

A further difficulty may arise when changing operating conditions prevail. This is the case if cyclic regeneration of catalyst material or flushing of biological material is required and the distributor must also overcome flow rates that are substantially different from those in normal operation during the regeneration.

SUMMARY OF THE INVENTION

The object of the invention is therefore to make available a distribution system for two liquid phases that are to be distributed uniformly into a plurality of tubes of an upright tube-bundle reactor for carrying out chemical or biological reactions, with which system the difficulties described above can be overcome.

The invention achieves this object by means of a liquid distributor for two liquid phases to be distributed uniformly into a plurality of tubes of an upright tube-bundle reactor for carrying out chemical reactions, where the tubes are retained at the top and bottom by tubesheets and are closed against the outside of the tube, a distribution chamber is arranged above the upper tubesheet and contains feed pipes for two different liquids and at least one gas phase, and a first liquid distribution system is arranged directly above the tubesheet or on it,
which system is connected to at least one outer feed device, and contains a weir, e.g. an annular weir, installed outside the tubed area, with openings at the bottom and a plurality of inlet sleeves,
wherein one inlet sleeve is assigned at the top to each of the tubes in the tube bundle, the inlet sleeves are of tubular design and are vertically aligned, and the said sleeves have at least one lateral and one further opening of a larger cross-section located above the tubesheet and are open at the bottom facing each assigned tube in the tube bundle, and a second liquid distribution system is arranged above the first liquid distribution system,
which system is connected to at least one other outer feed device and contains one upper and one lower distribution tray,
wherein the lower distribution tray contains a plurality of openings which are arranged flush above the inlet sleeves of the first liquid distribution system, and exhibits at least one device for setting a uniform liquid level above the openings,
wherein the upper distribution tray is connected to the feed device for liquid, and contains a plurality of overflow weirs or plate holes from which the liquid is able to discharge into the lower distribution tray, and wherein each of the overflow weirs is assigned to a plurality of openings in the lower distribution tray.

The mode of operation is in this case as follows: The first liquid is introduced from outside into the distribution chamber; this may take place laterally, for example, through an annular distributor of conventional design, or by other means. The turbulence of this inlet flow is broken by the annular weir so that only a steady, essentially uniform or laminar flow though the openings provided underneath the liquid level in the weir into the area of the inlet sleeves is achieved. The first liquid flows through the lateral openings of the inlet sleeves into the inside of the tube, then runs down the inner tube wall as far as the trickle-bed bulk material contained in the tubes. Here the shape of the openings defines the throughput through the openings as does the adjustable liquid level.

The second liquid is applied, e.g. from above, to an upper distribution tray acting as a pre-distributor, over whose overflow weirs or plate holes the second liquid runs onto a lower distribution tray acting as a fine distributor and constructed, for example, as a perforated distributor. The second liquid runs through the openings in the perforated distributor from above and down into the inlet sleeves, hitting the latter ideally in the centre and continuing to fall directly onto the trickle-bed bulk material contained in the tubes, where contact is made with the first liquid. As in the first distribution system, the shape of the openings defines the throughput through the openings as does the adjustable liquid level.

The gas to be supplied can be introduced at any point above the liquid level of the first distribution system and enters the trickle-bed section through the upper opening of the inlet sleeves.

In the case of flushing processes, e.g. in conjunction with regenerating the bulk material, the upper opening, which has a larger cross-section than the lower opening, can be used to introduce considerably larger throughputs into the bulk material.

If particle-sized contaminants which could clog the openings of the inlet sleeves or perforated plate are entrained in the liquids, the height of the lateral openings of the inlet sleeves and the height of the overflow weirs of the upper distribution tray enable larger particles to accumulate on the plate concerned in the off-stream area of the liquid flow without being carried into the openings, which is an advantage of the invention.

In embodiments of the invention the inlet sleeves exhibit at least one lower, smaller lateral hole, and at least one higher, larger lateral hole. A defined opening is made through the lower, smaller hole for the liquid to be distributed. The higher, larger hole is used to feed in flushing liquid. It should be provided well above the specified liquid level of the tubesheet.

Instead of holes, the openings may also be designed as notches, as have been provided, for example, in DE 29 19 462 A 1, FIGS. 1 and 1A, for extended distributor designs. The notches may be designed both as straight slots and wedge-shaped. Wire-shaped flow aids, down which the liquid is able to run on the inside of the inlet sleeves, may also be provided in the notches of the inlet sleeves.

In further embodiments of the invention provision can be made for the upper liquid distribution system to rest on the inlet sleeves of the lower liquid distribution system. This can provide an extremely stable design and it also simplifies the task of exact horizontal alignment of the lower distribution tray considerably compared to a freely supporting structure, which is an advantage of the invention.

The liquid distributor is advantageously of a dismountable, modular structure, e.g. honeycomb or segmented, if the tubed area of the tube bundle adopts a triangular position. It is particularly advantageous if a modular design is achieved when all the distribution systems rest one upon the other. Ideally the individual parts can be plugged in.

In a further embodiment of the invention the overflow weirs of the upper distribution tray of the second liquid distribution system exhibit a serrated shape on its upper edge or lower edge, or both.

In further embodiments of the invention the lower distribution tray is provided at its openings with discharge flow aids, e.g. annular grooves, so that lateral running due to surface tension is avoided. The lower distribution tray can also be provided with overflow weirs, according to FIG. 4 of DE-OS 22 12 816, which weirs each exhibit three outlets offset by 120 degrees, which outlets are each assigned flush to an inlet sleeve. Like the notched inlet sleeves, they can also be provided with discharge flow aids, for example, consisting of wires.

In further embodiments of the invention the inlet sleeves are positively connected to the tubesheet and the tubes. This can be achieved by rolling the inlet sleeves into the tube ends. The inlet sleeves may also be screwed into a separate shallow receptacle. Instead of the inlet sleeves, plug-in sleeves or other receiving devices may be fitted to the tube ends to provide a pluggable device.

BRIEF DESCRIPTION OF THE DRAWINGS

The invention is explained in greater detail in the following with reference to ten sketches, but the devices according to the invention are not limited to these embodiments given by way of example.

DESCRIPTION OF THE PREFERRED EMBODIMENT

Figure 1A:
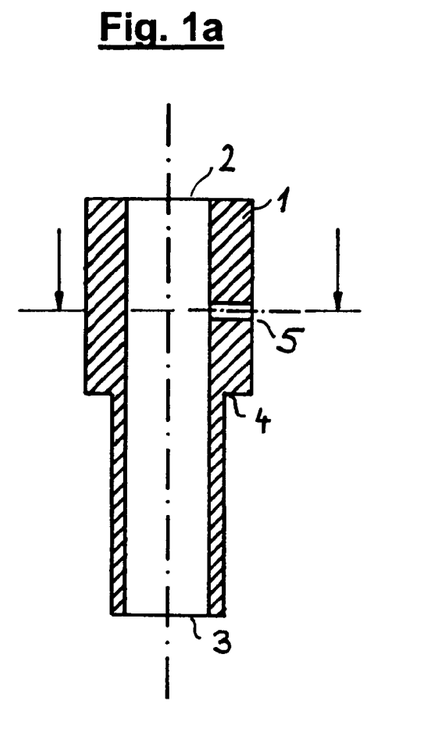
FIG. 1a shows a longitudinal section through an inlet sleeve provided with a hole.

FIG. 1a shows a longitudinal section of an inlet sleeve 1 with an upper opening 2, a lower opening 3, a neck 4 used to accommodate inlet sleeve 1 into the tubesheet, and hole 5 through which the liquid to be distributed is to flow into the inlet sleeve. Instead of one hole, as shown in FIG. 1a, a plurality of holes distributed around the periphery may also be used. Here the holes may also lie at different heights and have different diameters, but the hole pattern should be the same for all the inlet sleeves.

Figure 1B:
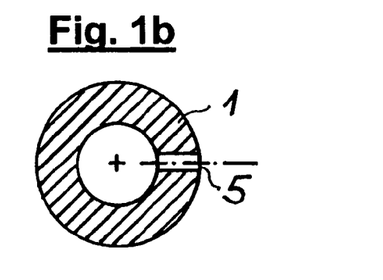
FIG. 1b shows a cross-section through an inlet sleeve provided with a radial hole.
Figure 1C:
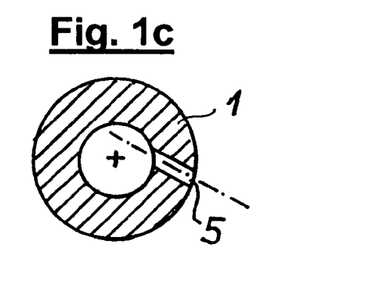
FIG. 1c shows a cross-section through an inlet sleeve provided with a tangential hole.

FIG. 1b and FIG. 1c show the cross-section of inlet sleeve 1 denoted by arrows in FIG. 1a. Hole 5 in FIG. 1b is here made in the radial direction, whilst hole 5, shown in FIG. 1c, is made in the tangential direction viewed from the inside diameter. The latter embodiment is advantageously used if several holes distributed around the periphery are to be used.

Figure 1D:
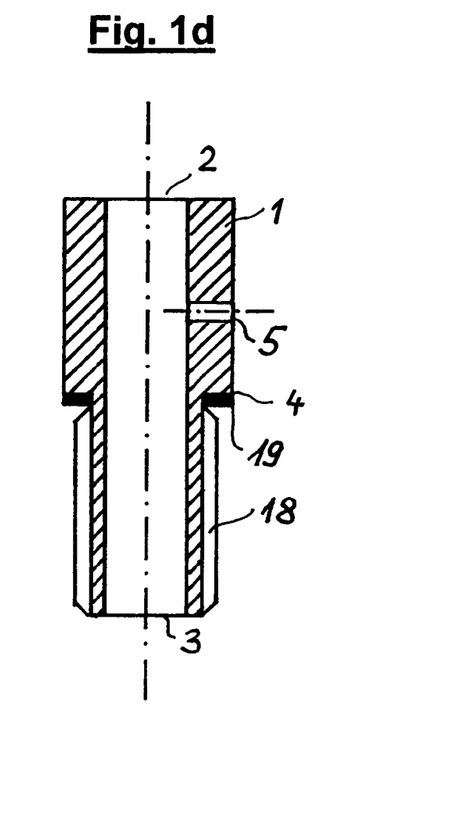
FIG. 1d shows a longitudinal section through an inlet sleeve provided with a hole, which sleeve is provided with a thread.

FIG. 1d shows a longitudinal section of inlet sleeve 1 with an upper opening 2, a lower opening 3, a neck 4 used to accommodate inlet sleeve 1, with thread 18, for screwing into a distributor receptacle, and hole 5 through which the liquid to be distributed is to flow into the inlet sleeve. Neck 4 is in this case provided with a seal 19.

Figure 2:
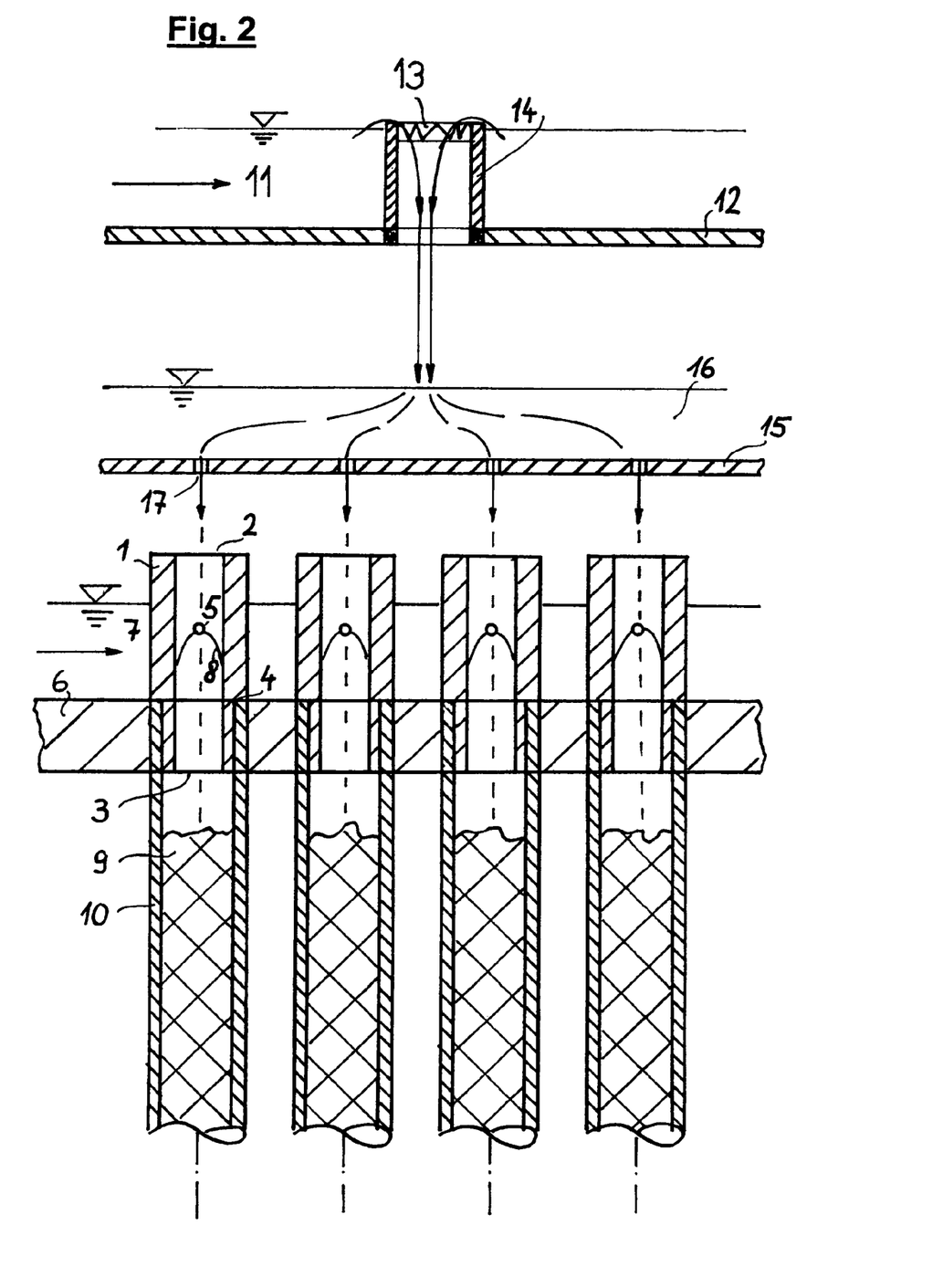
FIG. 2 shows a sectional view of the distributor in operation whilst being supplied with liquid.

FIG. 2 shows inlet sleeve 1 with upper opening 2, lower opening 3, neck 4 used to accommodate inlet sleeve 1 into tubesheet 6 (or distributor receptacle 20, see FIG. 3), and hole 5 through which the first liquid 7 to be distributed is to flow into inlet sleeve 1. Liquid 7 slows through hole 5 and down the inner wall of inlet sleeve 1 due to gravity, thus forming an outlet cone 8, as far as bulk material 9 in tubes 10. For a clearer illustration a further three inlet sleeves are shown (without figures), whose function and structure are identical. In practice several thousand inlet sleeves may also be used in a distributor.

The second liquid 11 to be distributed on pre-distribution tray 12 runs over the serrated upper edge 13 of overflow weir 14 (or sieve tray holes 29, see FIG. 4) as far as perforated fine distributor 15, where it forms a layer of liquid 16 of defined height. The second liquid 11 falls through holes 17 and upper openings 2 of inlet sleeves 1 directly onto bulk material 9, which is denoted by arrows.

Figure 3:
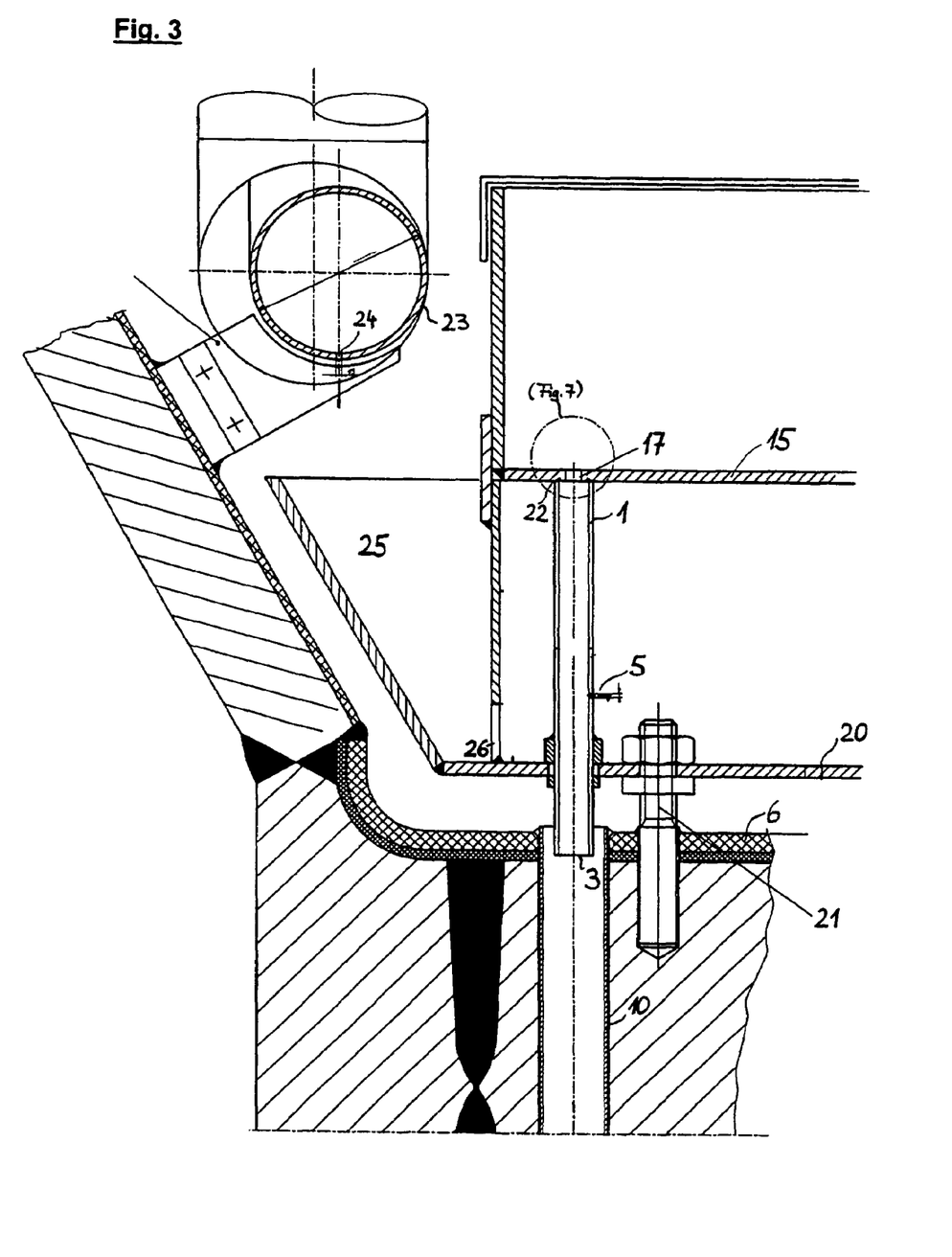
FIG. 3 shows a section through a distributor structure with a distributor receptacle.
Figure 7:
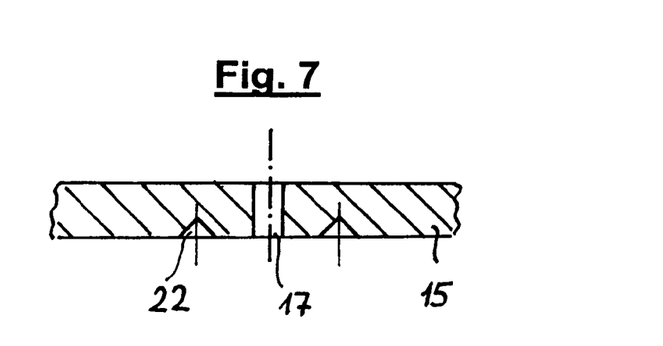
FIG. 7 shows a longitudinal section through a distribution tray provided with a hole, with an annular inlet groove around the hole.

FIG. 3 shows a distributor structure in which a distributor receptacle 20, which is secured with screw bolts 21 to distribution tray 6, is used. The liquid to be distributed in fine distributor 15 flows through holes 17 directly into inlet sleeves 1, on which fine distributor 15 rests directly. A clearance above inlet sleeves 1, as shown in FIG. 2, is not provided here. In order to prevent the liquid discharging from holes 17, from flowing in the lateral direction, caused by adhesion forces on the lower side of fine distributor 15, annular inlet groove 22 with a wedge-shaped cross-section is provided around each of holes 17, as also shown in detail in FIG. 7.

The liquid to be distributed from distributor receptacle 20, which liquid corresponds to liquid 7 in FIG. 2, flows from annular distributor 23 via holes 24 into receptacle inlet area 25, runs through openings 26 into the area where inlet sleeves 1 with holes 5 are located, and flows through holes 5 and lower openings 3 into the inside of tubes 10.

Figure 4:
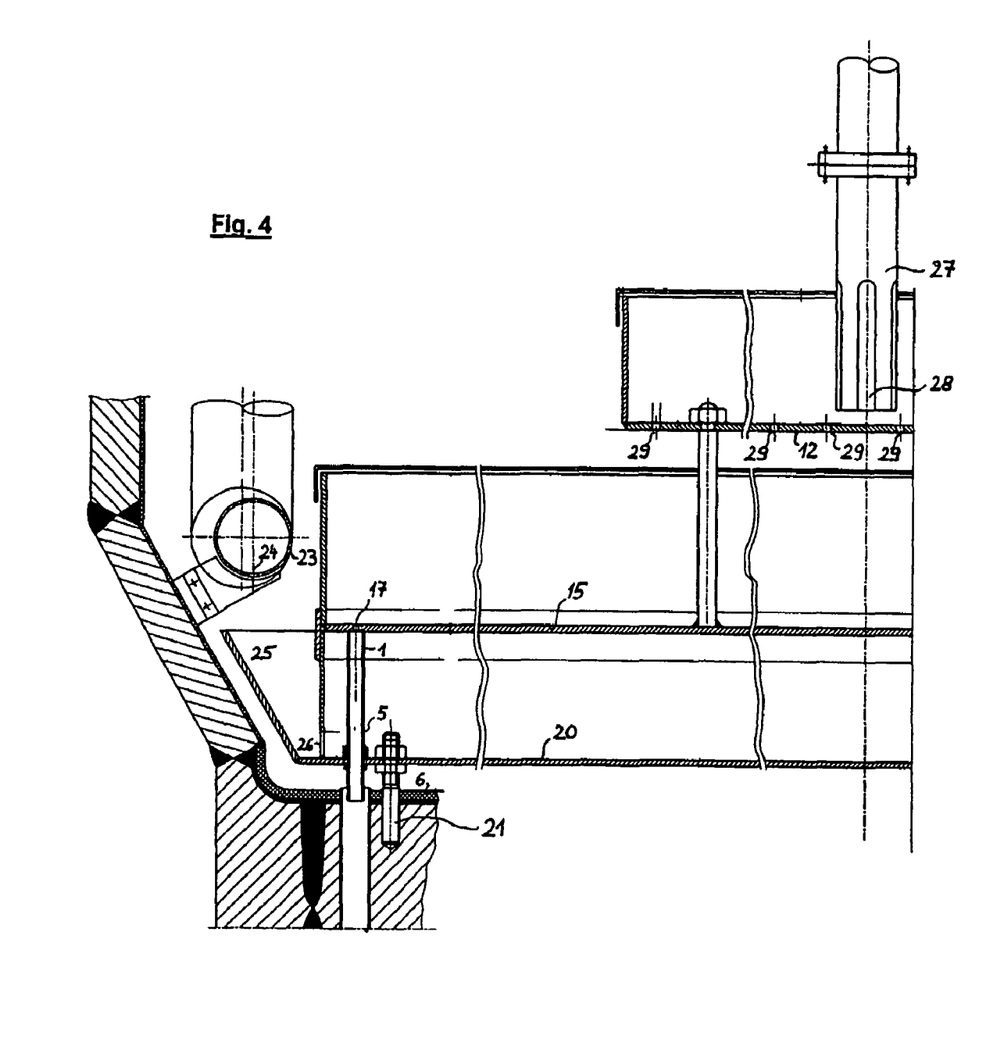
FIG. 4 shows a further section through the distributor structure shown in FIG. 3, together with a pre-distributor.

FIG. 4 also shows the structure shown in FIG. 3, wherein a pre-distribution tray 12, which allows liquid flowing from a liquid connection 27 through outlet slots 28 to discharge uniformly through a plurality of holes 29 onto perforated fine distributor 15.

Figure 5:
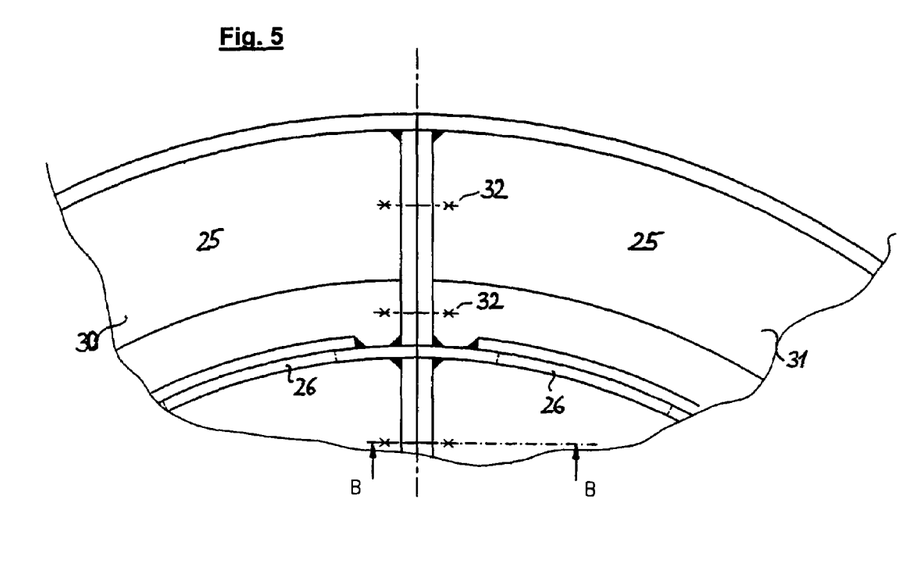
FIG. 5 shows a further section through the distributor structure shown in FIG. 3, with the possibility of segmentation.
Figure 6:
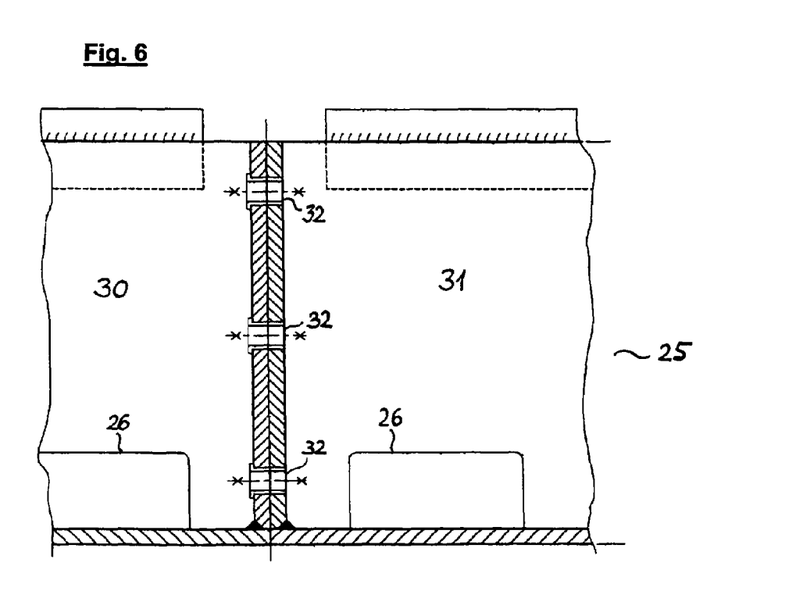
FIG. 6 shows a plan view of the segmentation of FIG. 5.

FIGS. 5 and 6 show the possibility of segmentation, in this case of receptacle inlet area 25, with openings 26, and part of distributor receptacle 20. Both segments 30 and 31 shown are screwed together at connection points 32. FIG. 5 shows this in a plan view, while FIG. 6 shows a view from the inside in the outward direction, as represented by reference B-B in FIG. 5. Obviously a variety of parting elements may be selected, which applies both to distributor receptacle 20—as shown—and similarly to perforated fine distributor 15 and pre-distributor 12 (not shown here).

Distributors of the type described above may be used highly advantageously in reactors for producing propylene oxide from propylene and hydrogen peroxide in the liquid phase.

LIST OF REFERENCES

1 Inlet sleeve
2 Upper opening
3 Lower opening
4 Neck
5 Hole
6 Tubesheet
7 First liquid
8 Outlet cone
9 Bulk material
10 Tube
11 Second liquid
12 Pre-distribution tray
13 Serrated upper edge
14 Overflow weir
15 Perforated fine distributor
16 Liquid layer
17 Holes
18 Thread
19 Seal
20 Distributor receptacle
21 Screw bolt
22 Annular groove
23 Annular distributor
24 Holes
25 Receptacle inlet area
26 Openings
27 Liquid connection
28 Outlet slots
29 Holes
30 Segment
31 Segment
32 Connection point

The invention claimed is:

1. A liquid distributor for two liquid phases to be distributed uniformly into a plurality of tubes of an upright tube-bundle reactor for carrying out chemical reactions, wherein the tubes are retained at the top and bottom by tubesheets and closed against the outside of the tube, and wherein a distribution chamber is arranged above the upper tubesheet, which chamber contains feed pipes for two different liquids and at least one gas phase, wherein the liquid distributor comprises:

a first liquid distribution system is arranged above a tubesheet or on it, which first system is connected to at least one outer feed device, and contains a weir, installed outside the tubed area, with openings at the bottom and a plurality of inlet sleeves, wherein one inlet sleeve is assigned at the top to each of the tubes in a tube bundle, the inlet sleeves are of tubular design and are vertically aligned, and said sleeves have at least one lateral and one further opening located above the tubesheet and are open at the bottom facing each assigned tube in the tube bundle, and a second liquid distribution system is arranged above the first liquid distribution system, which system is connected to at least one other outer feed device and contains one upper and one lower distribution tray, wherein the lower distribution tray contains a plurality of openings which are arranged flush above the inlet sleeves of the first liquid distribution system, and exhibits at least one device for setting a uniform liquid level above the openings, wherein the upper distribution tray is connected to the feed device for liquid, and contains a plurality of overflow weirs or plate holes from which the liquid is able to discharge into the lower distribution tray, and wherein each of the overflow weirs is assigned to a plurality of openings in the lower distribution tray.

2. The liquid distributor according to claim 1, wherein the inlet sleeves exhibit at least one lower, smaller lateral hole, and at least one higher, larger lateral hole.

3. The liquid distributor according to claim 1, wherein the inlet sleeves exhibit at least one lateral notch through which liquid is able to flow from the tubesheet into the inside of the tube.

4. The liquid distributor according to claim 3, wherein wire-shaped flow aids are provided in the at least one lateral notch of the inlet sleeves, down which such aids the liquid is able to run on the inside of the inlet sleeves.

5. The liquid distributor according to claim 1, wherein the upper liquid distribution system rests on the inlet sleeves of the lower liquid distribution system.

6. The liquid distributor according to claim 1, wherein it is dismountable and of modular structure.

7. The liquid distributor according to claim 6, wherein the individual parts can be plugged in.

8. The liquid distributor according to claim 1, wherein the overflow weirs of the upper distribution tray of the second liquid distribution system exhibit a serrated shape on its upper edge or lower edge, or both.

9. The liquid distributor according to claim 1, wherein the lower distribution tray is provided with overflow weirs or plate holes, each of which exhibit three outlets offset by 120 degrees, which outlets are each assigned flush to an inlet sleeve.

10. The liquid distributor according to claim 1, wherein the lower distribution tray is provided with discharge flow aids at its openings.

11. The liquid distributor according to claim 1, wherein the inlet sleeves are positively connected to the tubesheet and the tubes.

12. The liquid distributor according to claim 1, wherein the inlet sleeves are rolled into the tube ends.

13. A process for two liquid phases to be uniformly distributed into a plurality of tubes of an upright tube-bundle reactor, the liquids being two liquids which cannot be mixed and which, because of their non-miscibility, cannot be pre-mixed, wherein the liquids are introduced separately into the individual tubes of the tube bundle.

14. The process according to claim 13, wherein not only the two liquids but also a gas flow is fed into the individual tubes of the tube bundle.

15. A method of utilizing a liquid distributor, the distributor comprising:

a first liquid distribution system is arranged above a tubesheet or on it, which first system is connected to at least one outer feed device, and contains a weir, installed outside the tubed area, with openings at the bottom and a plurality of inlet sleeves, wherein one inlet sleeve is assigned at the top to each of the tubes in a tube bundle, the inlet sleeves are of tubular design and are vertically aligned, and said sleeves have at least one lateral and one further opening located above the tubesheet and are open at the bottom facing each assigned tube in the tube bundle, and a second liquid distribution system is arranged above the first liquid distribution system, which system is connected to at least one other outer feed device and contains one upper and one lower distribution tray, wherein the lower distribution tray contains a plurality of openings which are arranged flush above the inlet sleeves of the first liquid distribution system, and exhibits at least one device for setting a uniform liquid level above the openings, wherein the upper distribution tray is connected to the feed device for liquid, and contains a plurality of overflow weirs or plate holes from which the liquid is able to discharge into the lower distribution tray, and wherein each of the overflow weirs is assigned to a plurality of openings in the lower distribution tray, the method comprising uniformly distributing two immiscible liquids into a plurality of tubes of an upright tube-bundle reactor by separately introducing the liquids into the individual tubes of the tube bundle.

16. The method according to claim 15, wherein not only the two liquids but also a gas flow is fed into the individual tubes of the tube bundle.

* * * * *